United States Patent [19]

Noguchi

[11] Patent Number: 5,193,028
[45] Date of Patent: Mar. 9, 1993

[54] OPTICAL SYSTEM FOR ELIMINATING GHOST IMAGE IN WIDE WAVELENGTH BAND

[75] Inventor: Masato Noguchi, Tokyo, Japan

[73] Assignee: Asahi Kogaku Kogyo Kabushiki Kaisha, Tokyo, Japan

[21] Appl. No.: 790,410

[22] Filed: Nov. 8, 1991

[30] Foreign Application Priority Data

Sep. 11, 1990 [JP] Japan .................. 2-305778

[51] Int. Cl.$^5$ .................. G02B 1/10; G02B 5/28; G02B 7/04
[52] U.S. Cl. .................. 359/581; 359/590; 359/722; 359/723
[58] Field of Search .............. 359/580, 581, 589, 590, 359/676, 689, 691, 722, 723

[56] References Cited

U.S. PATENT DOCUMENTS

| | | | |
|---|---|---|---|
| 2,259,395 | 10/1941 | Sachtleben | 359/581 |
| 2,282,677 | 5/1942 | Rayton | 359/581 |

FOREIGN PATENT DOCUMENTS

| | | | |
|---|---|---|---|
| 55-65911 | 5/1980 | Japan | 359/581 |
| 1292717 | 10/1972 | United Kingdom | 359/581 |
| 2079968 | 1/1982 | United Kingdom | 359/581 |

Primary Examiner—Martin Lerner
Attorney, Agent, or Firm—Kane, Dalsimer, Sullivan, Kurucz, Levy, Eisele and Rihard

[57] ABSTRACT

A ghost image eliminating optical system in a transmission optical system including a plurality of transmission optical elements having boundary reflection surfaces, so that a ghost image can be formed by light reflected by at least two specific boundary reflection surfaces, wherein the specific boundary reflection surfaces are coated with at least two anti-reflection coatings having complementary reflection characteristics to eliminate the ghost image.

26 Claims, 16 Drawing Sheets

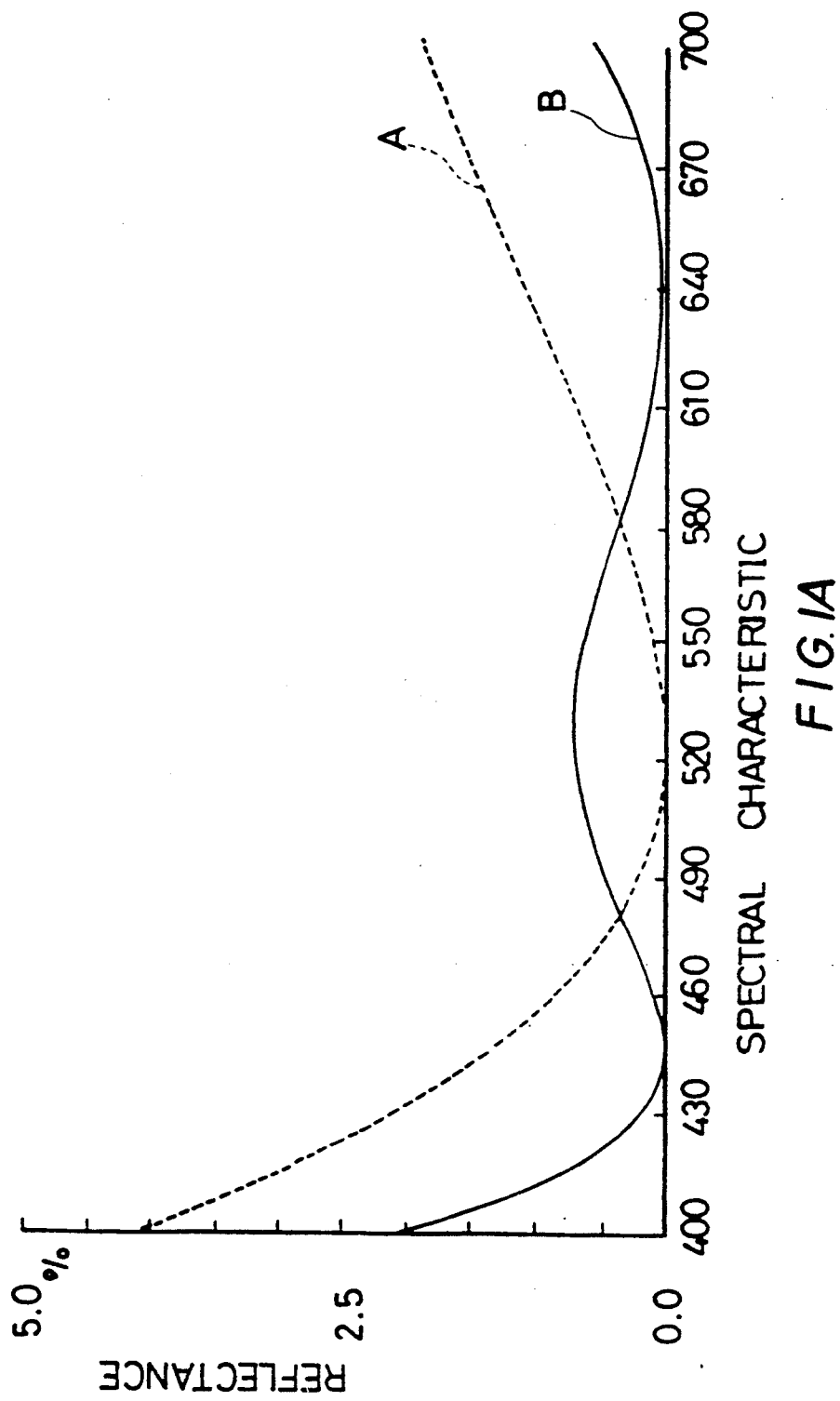

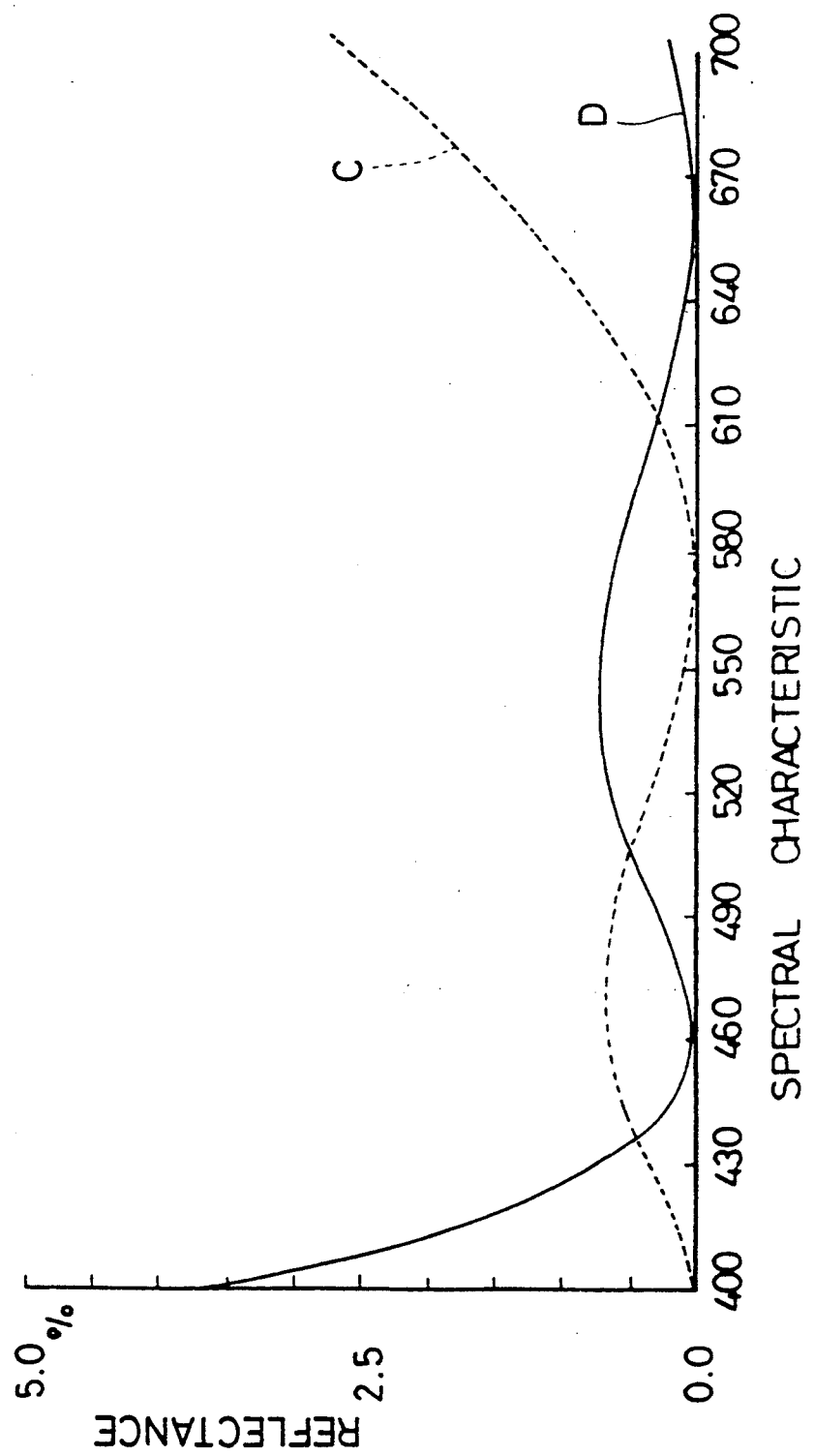

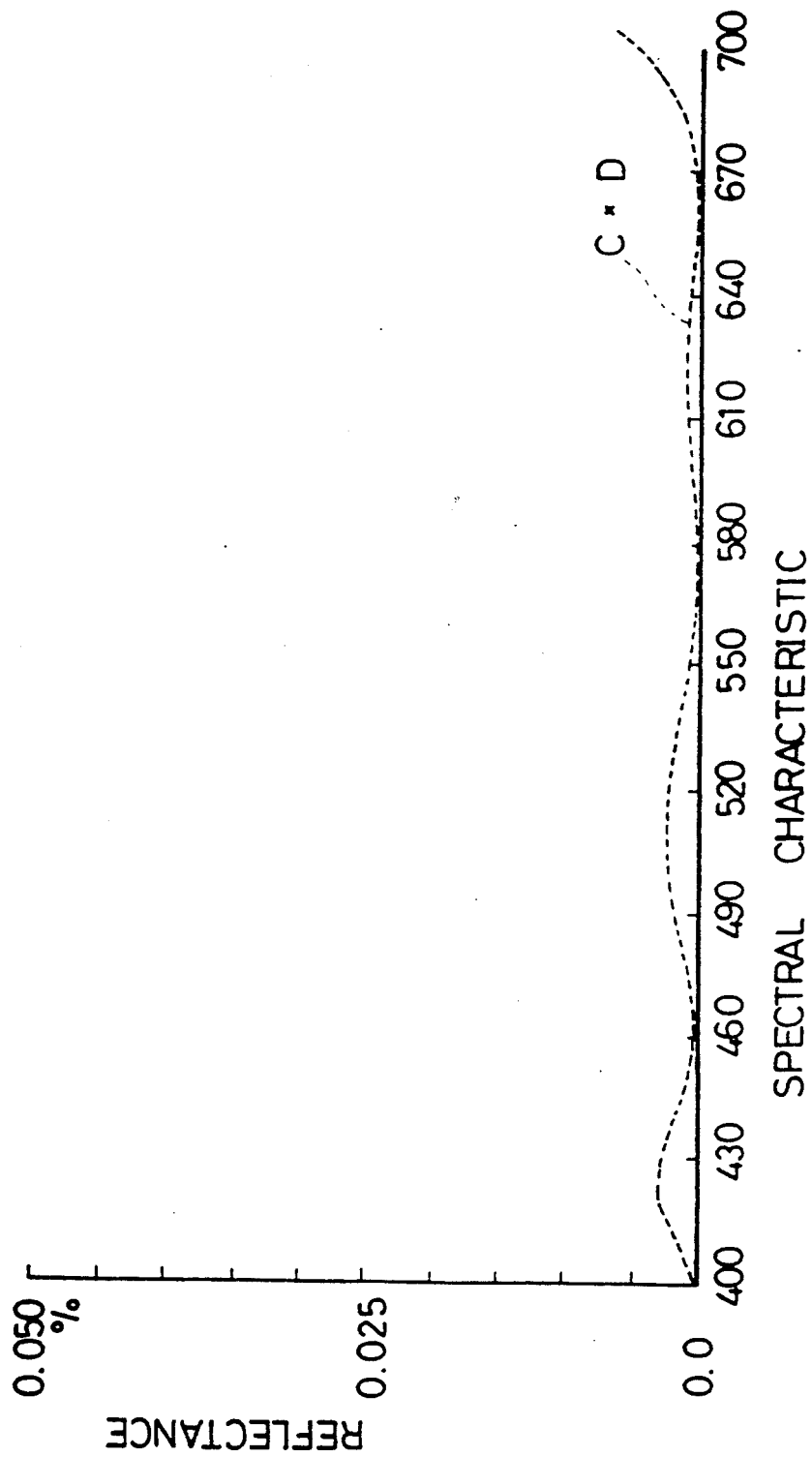

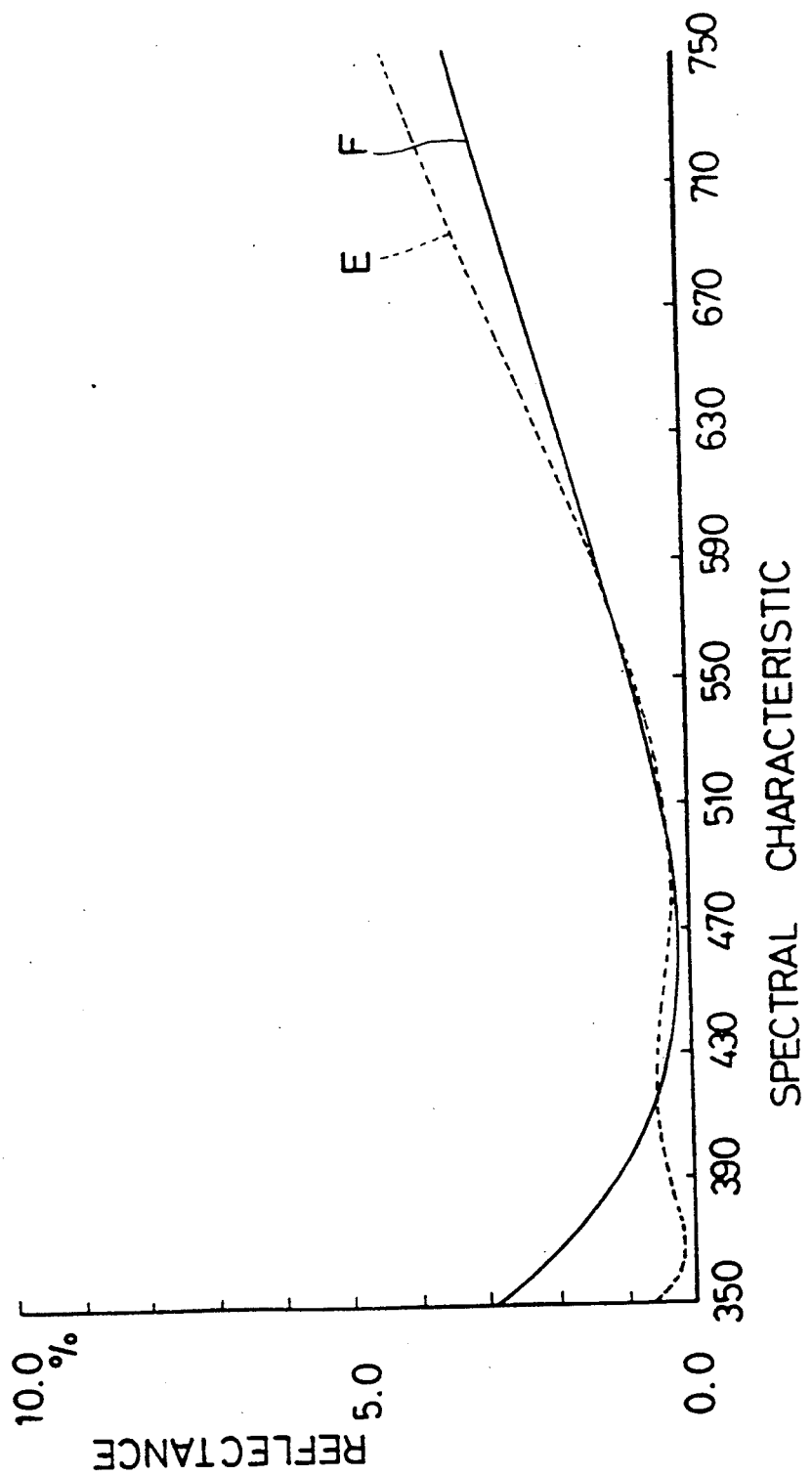

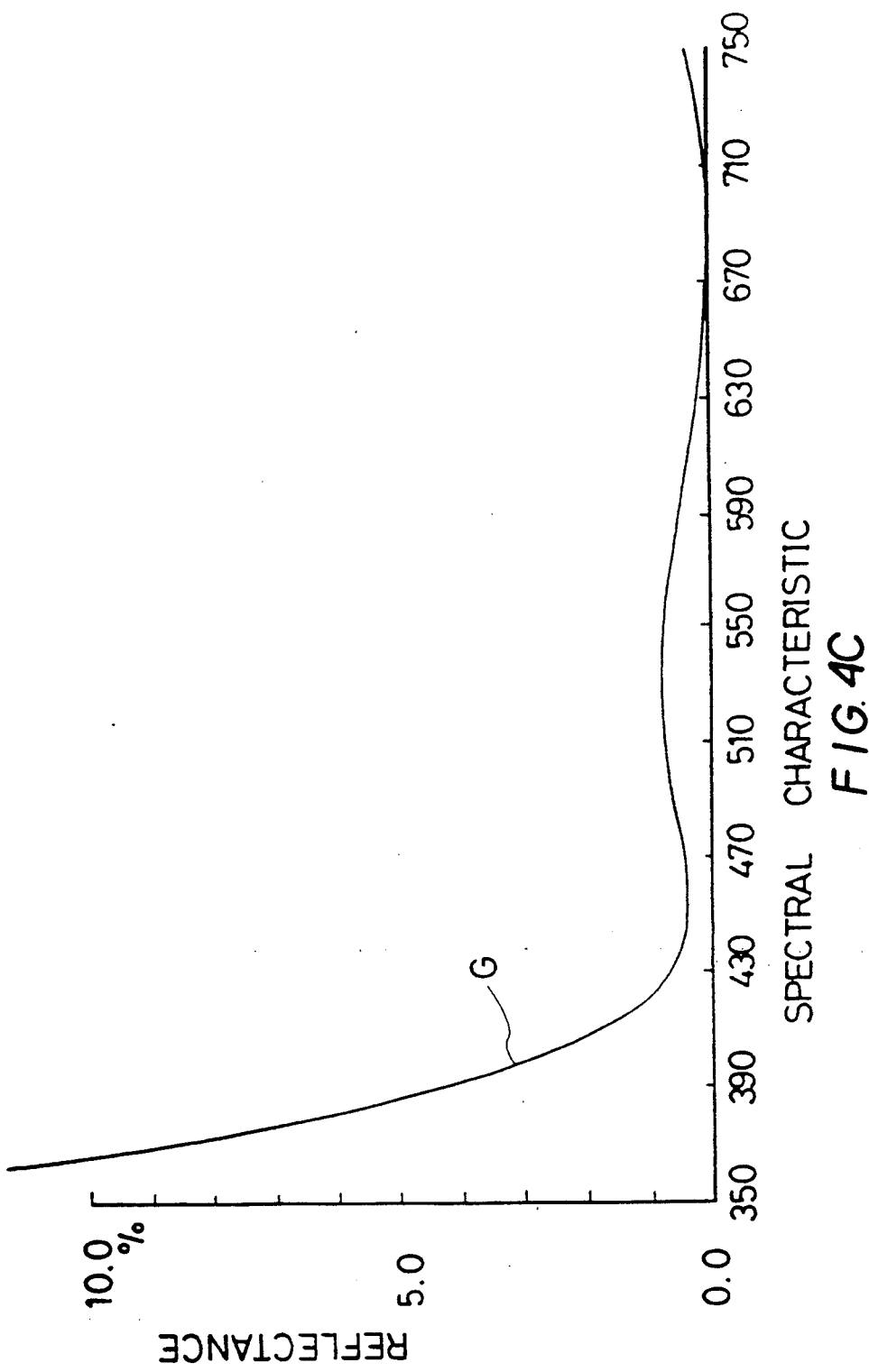

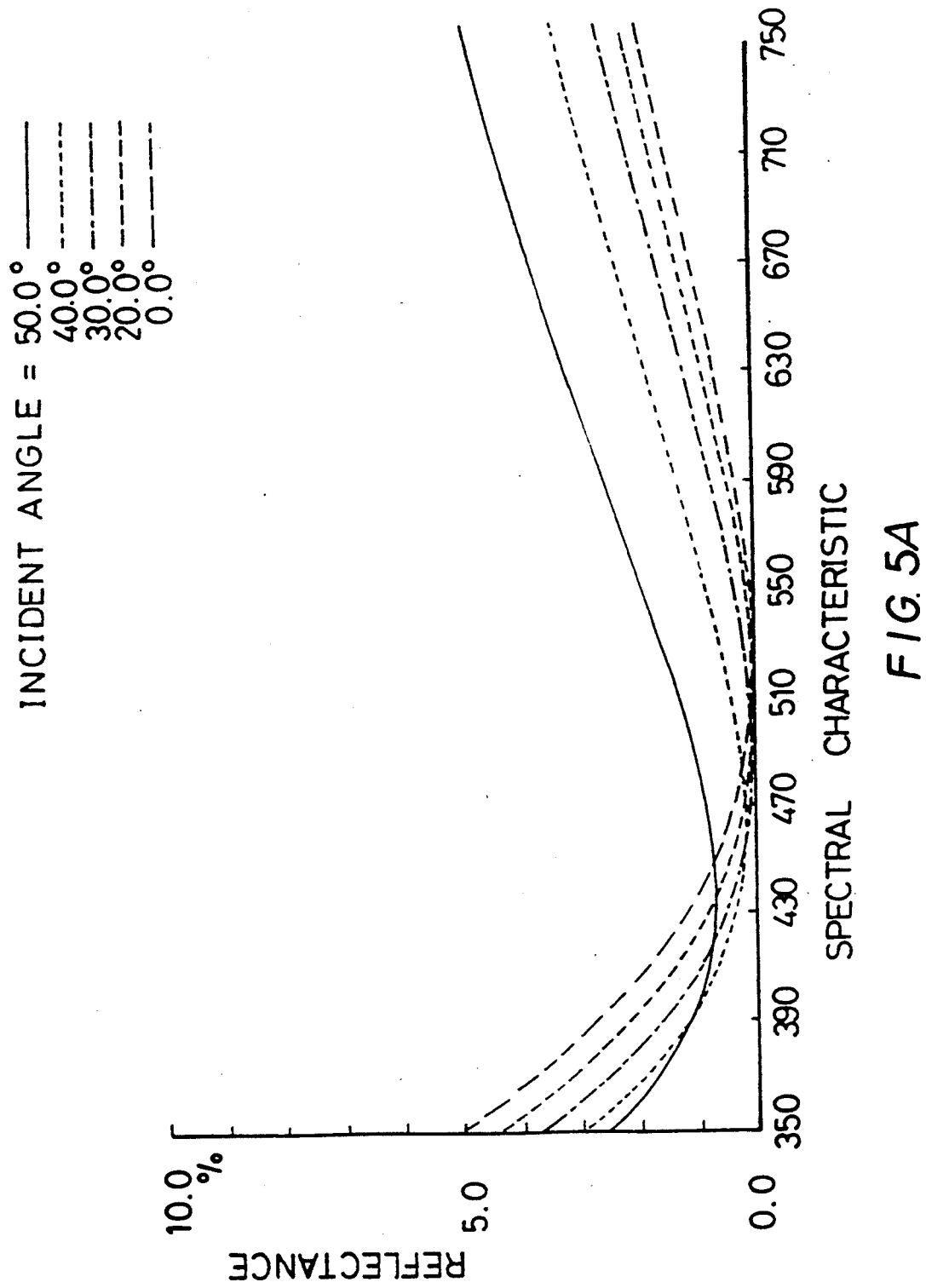

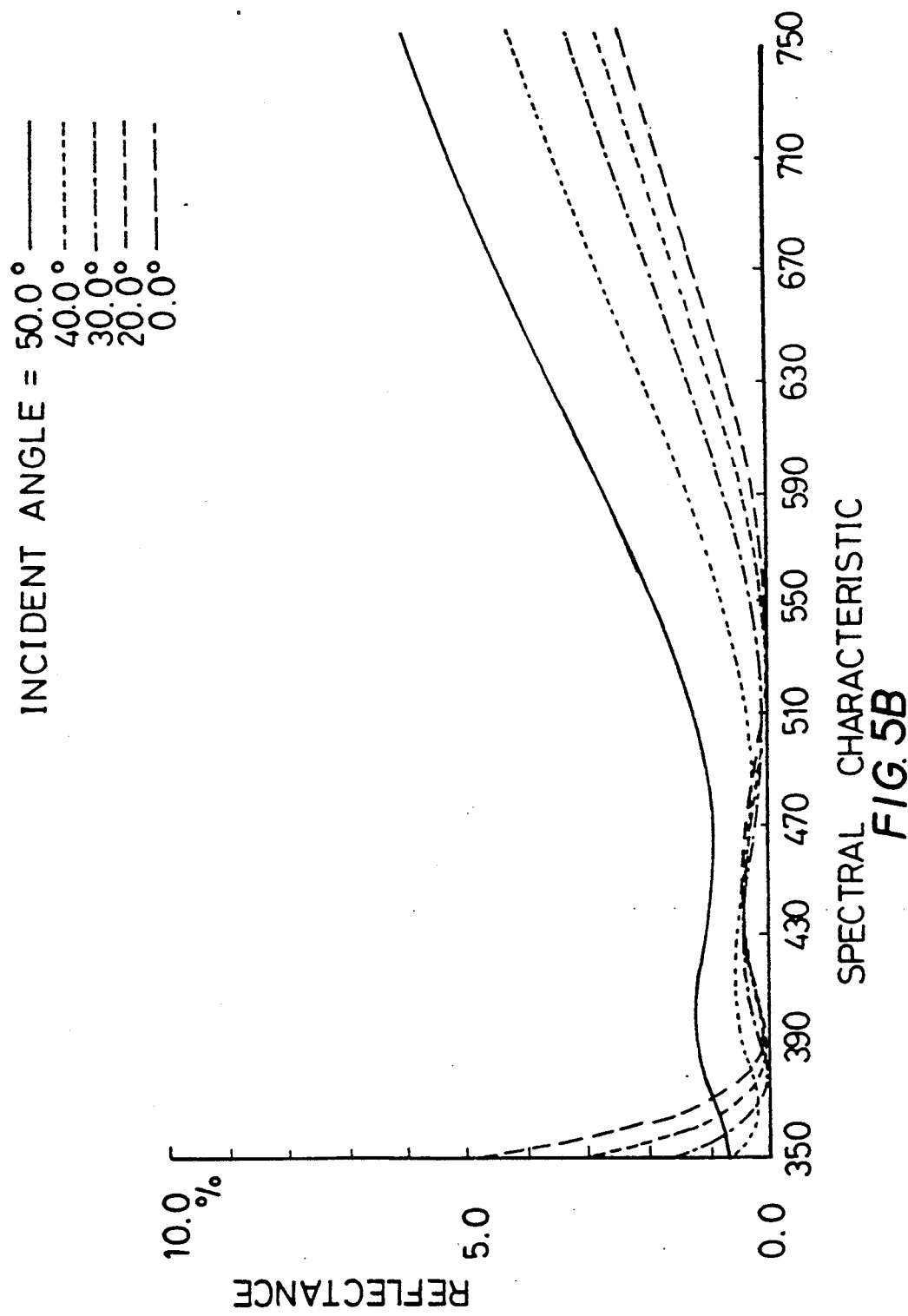

OPTICAL SYSTEM FOR ELIMINATING GHOST IMAGE IN WIDE WAVELENGTH BAND

BACKGROUND OF THE INVENTION

1. Field of the Invention

The present invention relates to an optical system for eliminating a ghost image of a transmission optical system in a wide wavelength band.

2. Description of Related Art

For instance, in a photographic lens, even if no intensive light source (e.g., sunlight) exists in a picture plane, a ghost image can appear when a plurality of images are formed on a picture plane by light beams of an intensive light source reflected by surfaces (boundary reflecting surfaces) of a plurality of constituent lenses (transmission optical elements). In other words, a ghost image does not appear when there is no reflection of light beams by the lens surfaces. Accordingly, measures to eliminate the ghost image have been directed to a reduction in reflectance (reflectivity) of the lens surfaces. It is necessary to coat the lens surfaces with an anti-reflection layer, such as a multi-coating layer to effectively prevent reflection in a wide wavelength band. However, multi-coating is expensive and can not completely eliminate the ghost image in a wide wavelength band. Namely, the wider the wavelength band, the more difficult it is to prevent a ghost image.

SUMMARY OF THE INVENTION

The primary object of the present invention is to provide a less expensive optical system which can eliminate a ghost image in a wider wavelength band.

Another object of the present invention is to provide a simple optical system which can easily eliminate a ghost image, taking into account a refractive index of a medium at a reflective surface and the angle of incident light upon the reflective surface.

As mentioned above, a ghost image can occur when there are reflections at two or more boundary reflection surfaces of a plurality of transmission optical elements. Accordingly, the improvement of the present invention is directed to the combined characteristics of anti-reflection coating layers provided on the boundary reflection surfaces in order to prevent a ghost image from being formed.

According to the present invention, boundary reflection surfaces which would otherwise cause a ghost are coated with anti-reflection coatings having reflection properties which are complementary to each other. For example, of the two boundary reflection surfaces A and B, the wavelength band reflected by surface A is transmitted by surface B or vice versa, thereby preventing a ghost image.

The expression "reflection properties complementary to each other" referred to herein means that the two surfaces are coated with anti-reflection layers which have different (opposite) reflection properties so that the wavelength band which is not covered by one of the surfaces, i.e., the wavelength band having a relatively large reflectance, is covered by the other surface and vice versa. As fewer layers of anti-reflection coating are necessary in the present invention, the cost is much lower than that of multi-coating.

The anti-reflection property of the anti-reflection coating depends on the refractive index (n) of the medium and the incident angle ($\theta$) of light upon the lens surface. It should be noted that the reflectance increases as $n \cdot \sin \theta$ increases and that an increase of reflectance as $n \cdot \sin \theta$ increases is more significant on the long wavelength side than the short wavelength side. Namely, there is no remarkable increase of reflectance on the short wavelength side even if $n \cdot \sin \theta$ increases. The ghost image tends to occur when the value of $n \cdot \sin \theta$ is large. In this case, generally speaking, the value of $n \cdot \sin \theta$ at the second reflection surface is smaller than that of the first reflection surface.

According to another aspect of the present invention, provision is made for a ghost eliminating optical system wherein the specific boundary reflection surface having a smaller incident angle is coated with an anti-reflection coating which has a smaller reflectance in the long wavelength band than the short wavelength band. In this arrangement, the weak point of the boundary reflection surface that has a large incident angle causing a large reflectance in the long wavelength band can be compensated for by the anti-reflection coating provided on the boundary reflection surface that has a small incident angle.

More precisely, according to the present invention, assuming that the refractive indices of media defined by the specific boundary reflection surfaces are n, and the angles of light incident thereon are $\theta$, the specific boundary reflection surface that has a small value of $n \cdot \sin \theta$ is coated with an anti-reflection coating which has a smaller reflectance in the long wavelength band than the short wavelength band.

The present disclosure relates to subject matter contained in Japanese patent application No. 2-305778 filed on Nov. 9, 1990) which is expressly incorporated herein by reference in its entirety.

BRIEF DESCRIPTION OF THE DRAWINGS

Below, a detailed explanation will be made of the present invention based on the embodiments shown in the attached drawings in which:

FIGS. 1a and 1b are diagrams showing characteristics of the anti-reflection coating layers in a ghost image preventing optical system, according to a first embodiment of the present invention;

FIGS. 2a and 2b are diagrams showing characteristics of anti-reflection coating layers in a ghost image preventing optical system, according to a second embodiment of the present invention, respectively;

FIGS. 4a, 4b, 4c and 4d are diagrams showing characteristics of anti-reflection coating layers in a ghost image preventing optical system, according to the present invention in which an incident angle is taken into account, and comparative examples;

FIGS. 5a and 5b are diagrams showing a relationship between an incident angle and reflectance;

DESCRIPTION OF THE PREFERRED EMBODIMENTS

FIGS. 1a through 3 show a first embodiment of the present invention.

Figure 3:
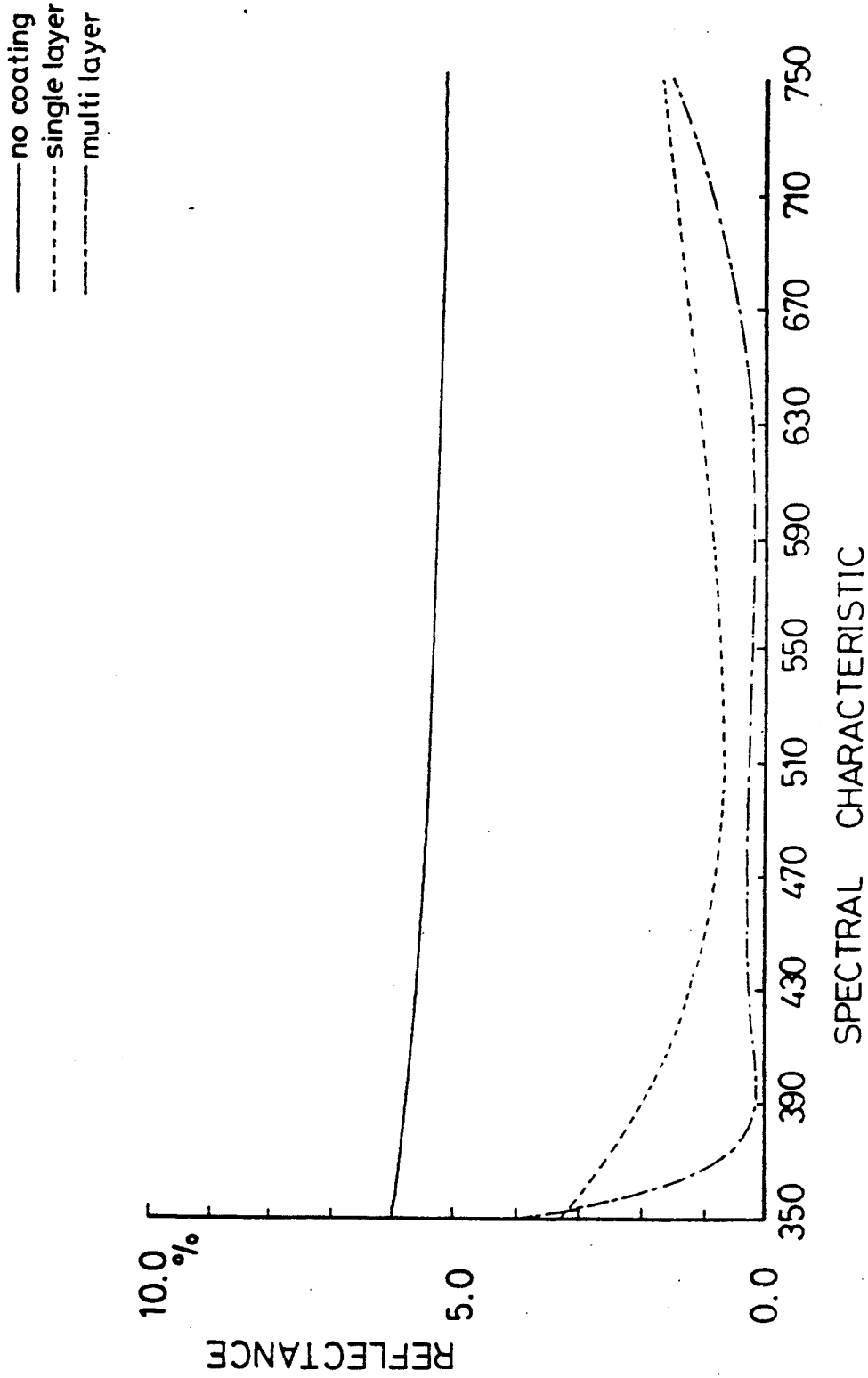
FIG. 3 is a diagram showing general characteristics of known anti-reflection coating layers.

In FIG. 3, a solid line, a dotted line and a dotted-dashed line represent anti-reflection characteristics when no anti-reflection coating is provided, a single layer of anti-reflection coating is provided, and a multi-layer of anti-reflection coating is provided, respectively.

As can be seen in FIG. 3, in 400~700 nm which is generally considered a sensitivity area of common photographic color film, a multi-coating has a higher anti-reflection effect than a single coating. Note that although the film sensitivity area of color film is usually 350~700 nm, a wavelength of less than 400 nm is usually absorbed by the lens, therefore a wavelength of less than 400 nm is negligible in the assessment of a ghost image. In the prior art, all reflection surfaces which could cause a ghost were coated with a multi-layer coating to eliminate the ghost.

FIG. 1a shows two different kinds of anti-reflection characteristics A and B which are obtained by two different coating layers. In curve A (dotted line), there is a minimum value of reflectance at about 520 nm and the reflectance increases on opposite wavelength sides of the minimum value. On the other hand, in the curve B (solid line), there are two minimum values at about 450 nm and 640 nm, and the reflectance increases in the wavelength areas outside and between the minimum values. The reflectance can be easily reduced by the two coating layers within a specific wavelength band.

The main feature of the present invention resides in the combination of the anti-reflection coatings A and B. Namely, the weak point of the anti-reflection coating B which exhibits a high reflectance in the wavelength band between 450 nm and 640 nm is compensated by the low reflectance of anti-reflection coating A in the same wavelength band between 450 nm and 640 nm, particularly in the vicinity of 520 nm. Consequently, an optical system which prevents a ghost image throughout the whole wavelength band can be realized.

Figure 1B:
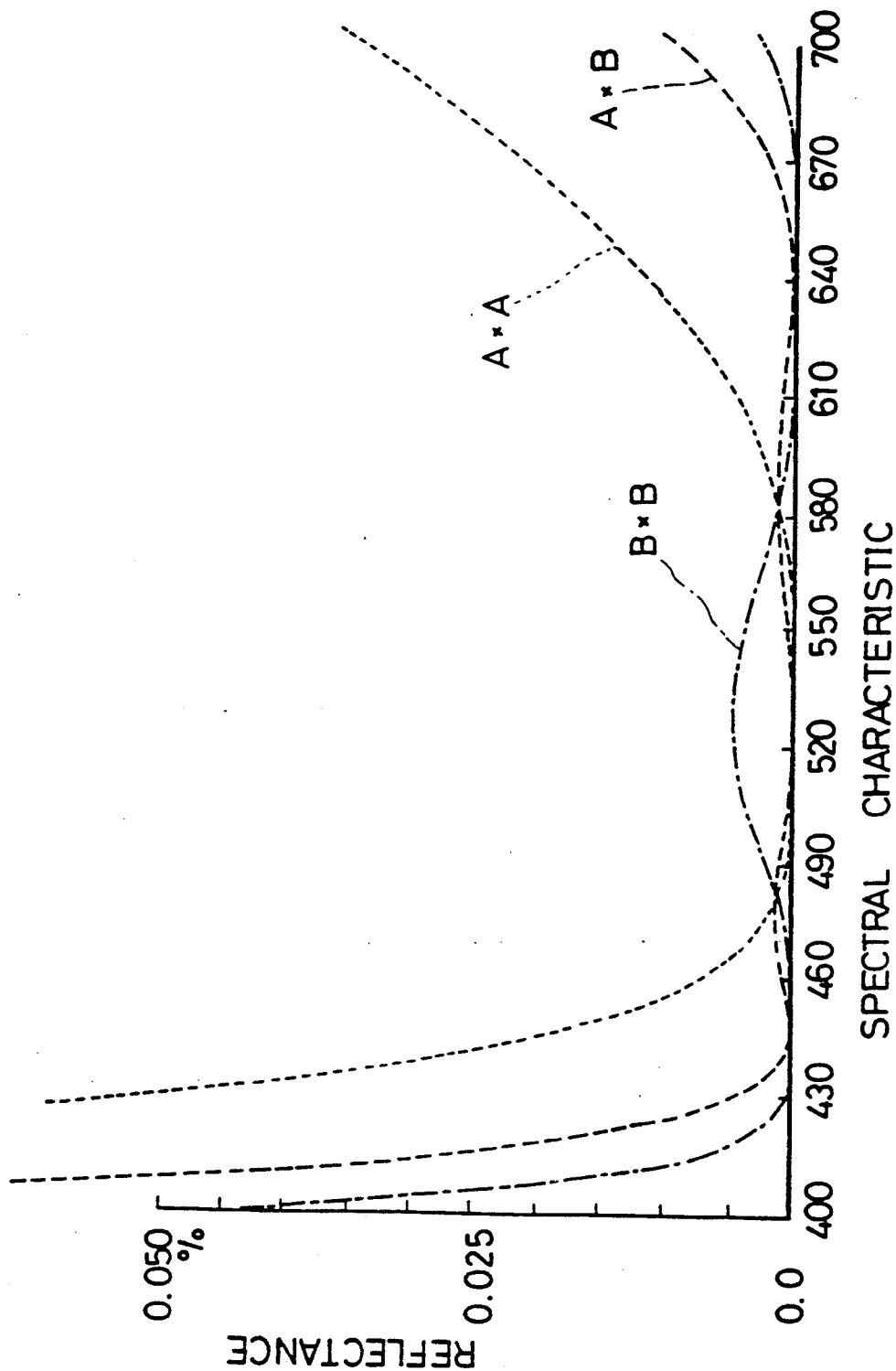

FIGS. 1b shows the reflectance characteristics when the two reflection surfaces which cause a ghost image are coated with the same anti-reflection coating A (A×A), the same anti-reflection coating B (B×B), and different anti-reflection coatings A and B (A×B). As the tendency of ghost image occurrence depends on the magnitude of reflectance, an outstanding ghost elimination effect can be achieved in accordance with the present invention wherein the surfaces are coated with different coatings A and B (see FIG. 1b). It should be noted that although the coatings A and B are both realized by two layers in FIG. 1b, it is possible to obtain the same effect by a combination of single layers.

FIGS. 2a and 2b show a second embodiment of the present invention, in which an anti-reflection coating C (two layers) exhibits minimum reflectance at about 400 nm and 570 nm, and an anti-reflection coating D (two layers) exhibits minimum reflectance at about 460 nm and 660 nm. In the second embodiment, as shown in FIG. 2b, the resultant reflectance of the anti-reflection coatings C and D is very small throughout the whole wavelength band, resulting in a high degree of ghost image prevention.

FIGS. 4 (4a through 4d) and 5 (5a and 5b) show different embodiments of the present invention. FIGS. 5a and 5b show relationships between the reflectance and refractive index of a medium and the angle (n . sin $\theta$) of light incident thereon. The relationship is shown for a single coating layer in FIG. 5a and for a multi-coating layer in FIG. 5b. Here, n . sin $\theta$ is argued as an incident angle as a whole.

As can be seen from FIGS. 5a and 5b, reflectance generally increases with the incident angle (n . sin $\theta$), in the long wavelength band, regardless of the number of layers. Conversely, in the short wavelength band (around 500 nm), there is little increase in reflectance even when the incident angle (n . sin $\theta$) becomes large, and in the shorter wavelength band (smaller than 500 nm), the reflectance gradually decreases as the incident angle (n . sin $\theta$) becomes large.

The present invention is also focused on the feature shown in FIGS. 5a and 5b., wherein it is assumed that light is incident upon the reflection surfaces at both large and small angles of incidence, in which the surface of the small incident angle is coated with an anti-reflection coating having a smaller reflectance in the long wavelength band than the short wavelength band. The refractive index n is that of the medium in which the reflected light immediately exists. Namely, in the case of light which is transmitted through the air and reflected by a glass surface, the refractive index is that of the air, and in the case of light which is transmitted through the glass and is reflected by the boundary surface of the glass, the refractive index is that of the glass.

FIG. 4a shows the reflectance characteristics of two kinds of the anti-reflection coatings with which the reflection surface of a larger incident angle (40°) is coated. The curves E and F represent a single layer and a multi-layer, respectively.

Figure 4B:
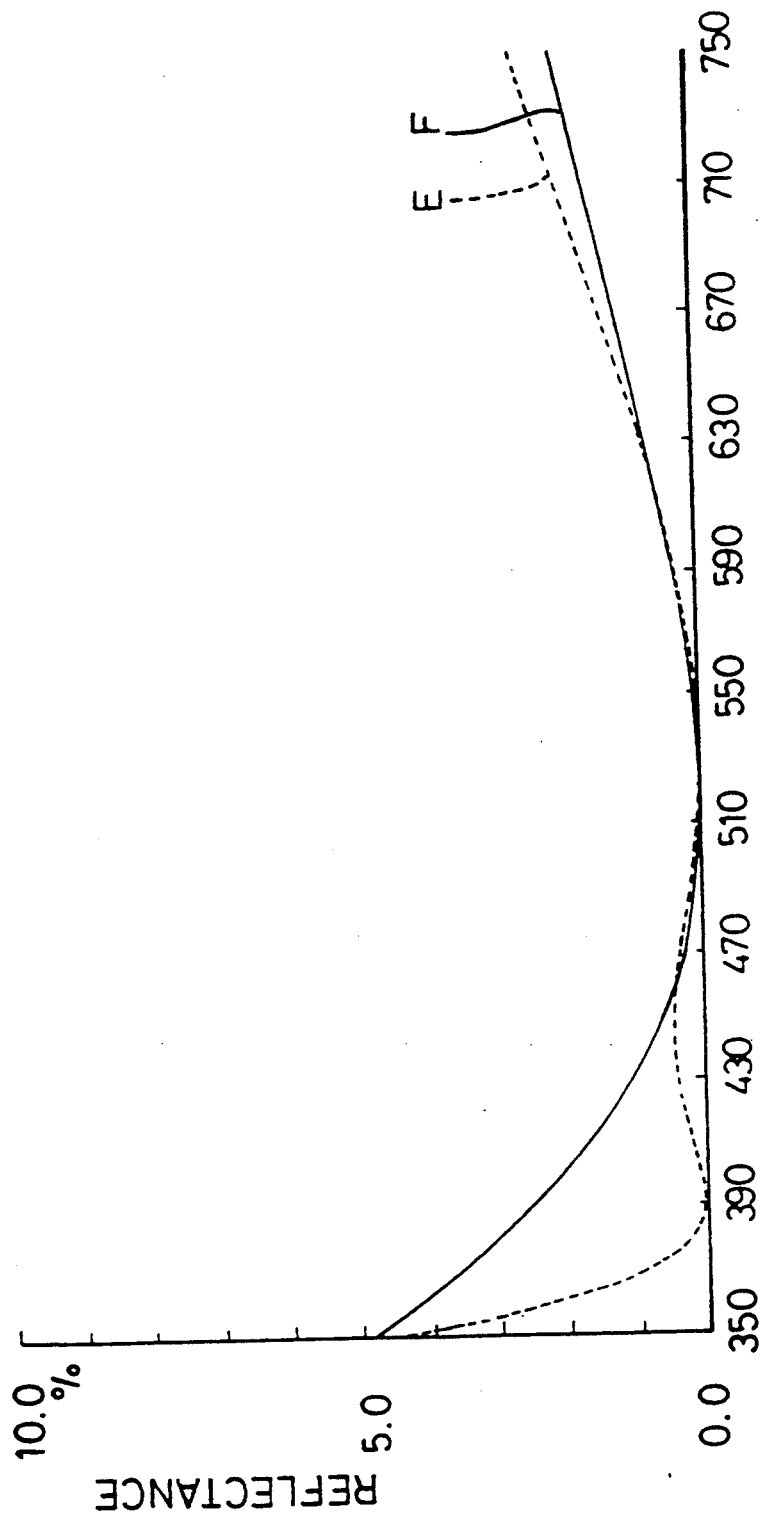

FIG. 4b shows the reflectance characteristics of the anti-reflection coatings E and F with which a reflection surface having a smaller incident angle (10°) is coated. The curves E and F shown in FIGS. 4a and 4b correspond to prior art. The present invention is realized by the resultant reflectance characteristics (curves E×E or F×F) of those shown in FIGS. 4a and 4b, as shown in FIG. 4d.

FIG. 4c shows a reflectance characteristic of an anti-reflection coating G with which a reflection surface having a smaller incident angle is coated. The curve G has a small reflectance in the long wavelength band rather than the short wavelength band. As mentioned above, the reflectance of a reflection surface having a small incident angle, i.e. small n . sin $\theta$, is large in the long wavelength band, and accordingly, the reflection surface having a small incident angle is coated with the anti-reflection coating G, which has a small reflectance in the long wavelength band, in order to compensate for the large reflectance. As can be seen from FIG. 4c, the anti-reflection coating G has a good anti-reflection effect in the long wavelength band (above about 450 nm). Consequently, the reflectance sharply increases in the wavelength band below about 430 nm.

Figure 4D:
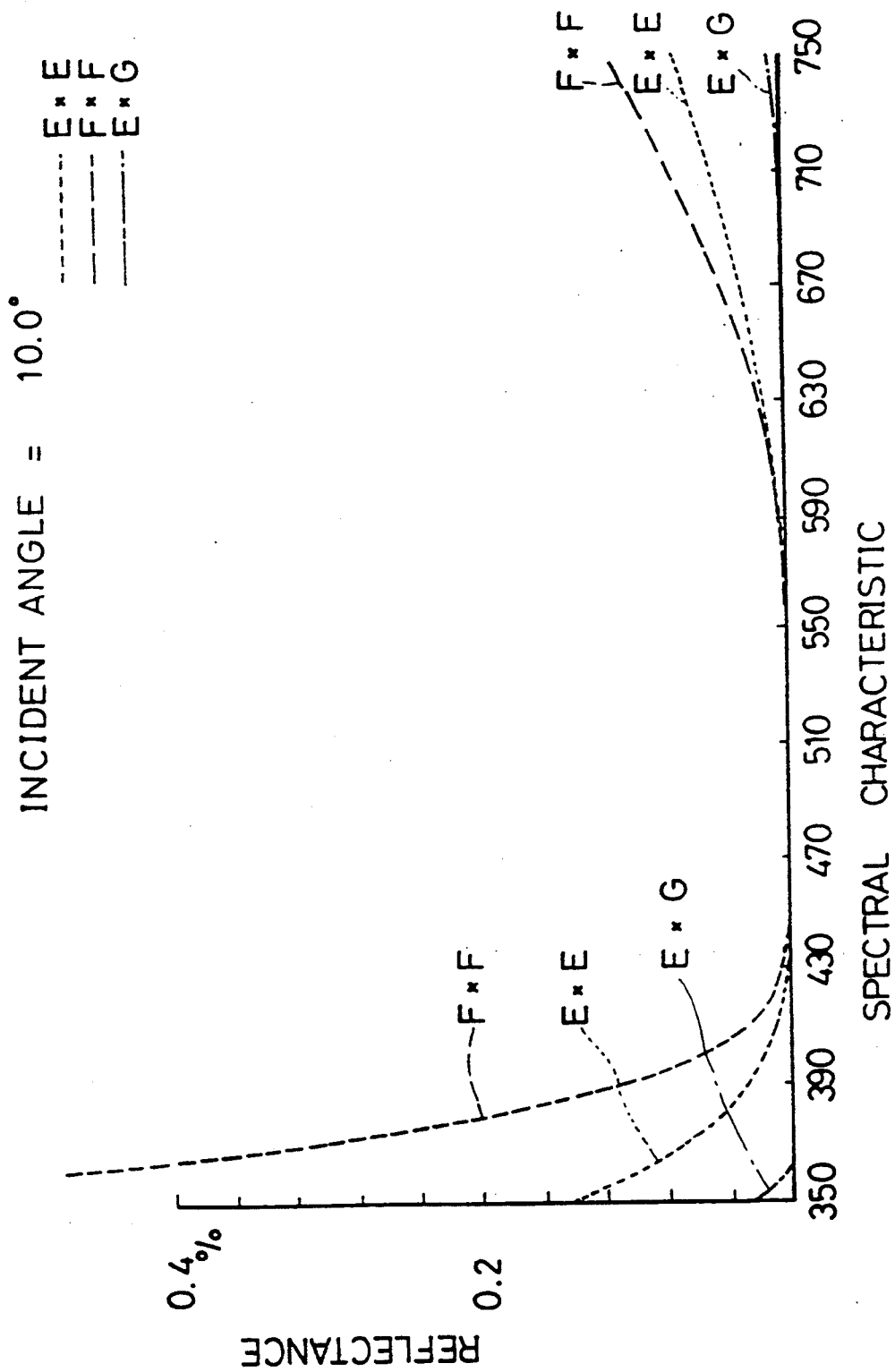

In FIG. 4d the reflectance characteristic (E×G), which is a combination of an anti-reflection coating E with which the reflection surface having a larger incident angle is coated and an anti-reflection coating G with which the reflection surface having a smaller incident angle is coated, is also shown. The curve E×G has a better ghost prevention effect than the curves E×E and F×F of prior art.

The angle of light incident upon the reflection surfaces, which causes the ghost image, can easily be determined by simulation and tracing of the light path of an associated optical system. If the ghost image is formed by more than two boundary reflection surfaces, each of the additional surfaces are coated with an anti-reflection coating having anti-reflection characteristics which complement the anti-reflection characteristics of the other surfaces.

The following discussion will be directed to a lens arrangement having reflection surfaces which are coated with anti-reflection coatings.

Figure 6:
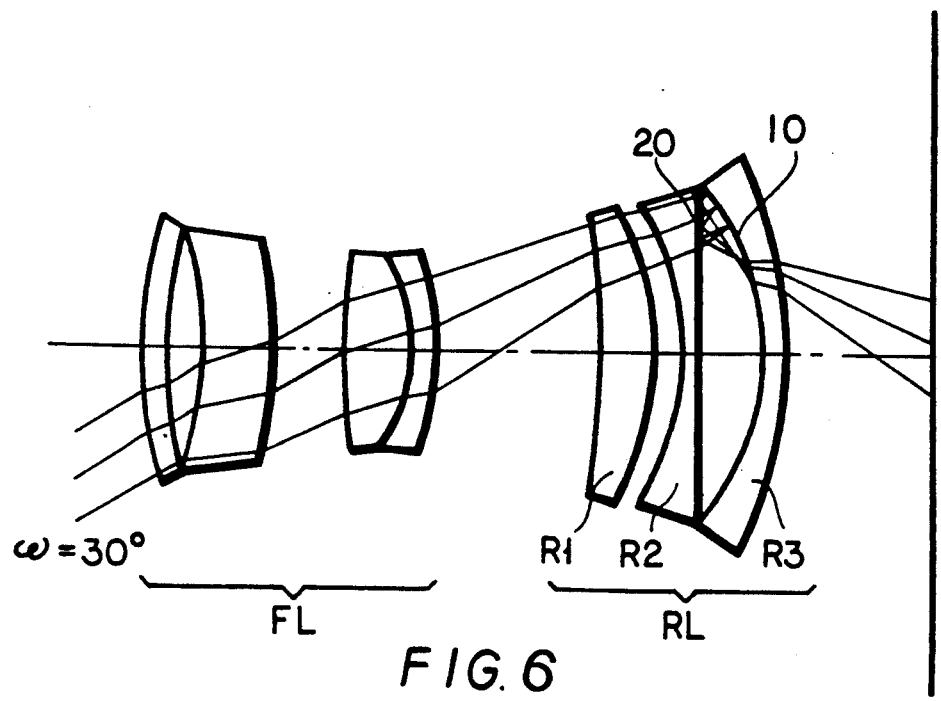
FIG. 6 is a schematic view of a lens arrangement to which a ghost prevention optical system according to the present invention is applied, by way of example.
Figure 7:
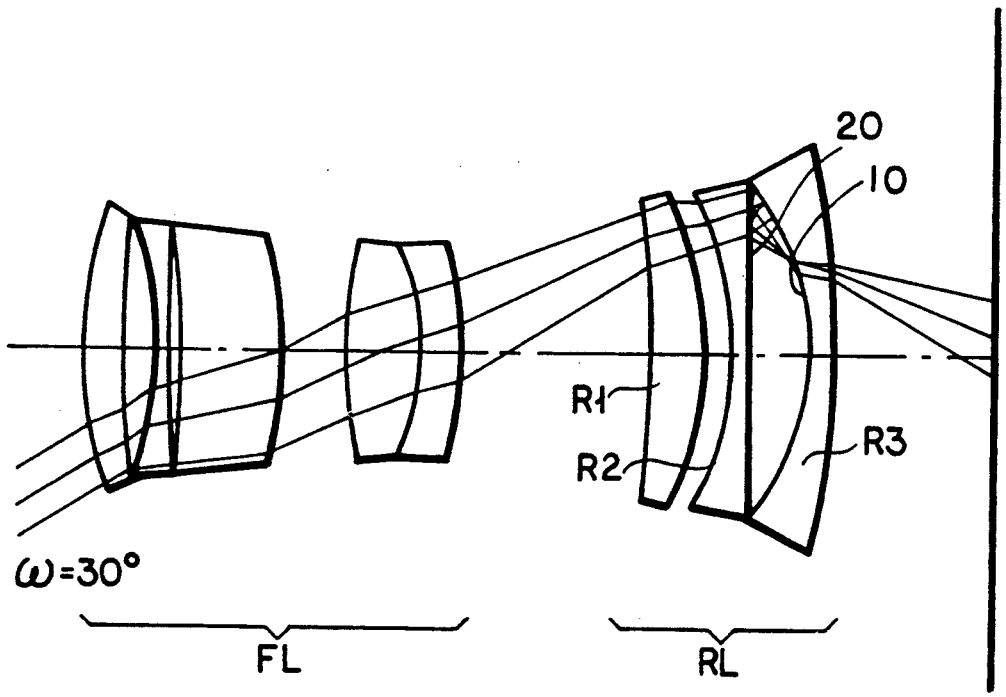
FIG. 7 is a schematic view of a lens arrangement to which a ghost prevention optical system according to another aspect of the present invention is applied.

FIGS. 6 and 7 show telephoto type lens units, each having a front positive lens group FL and a rear negative lens group RL, to which the present invention is applied. It has been experimentally found that in a telephoto type lens unit the ghost image is usually formed by the reflection surfaces of the rear negative lens group RL, regardless of the lens type, i.e., a fixed focus lens or a zoom lens.

Figure 8A:
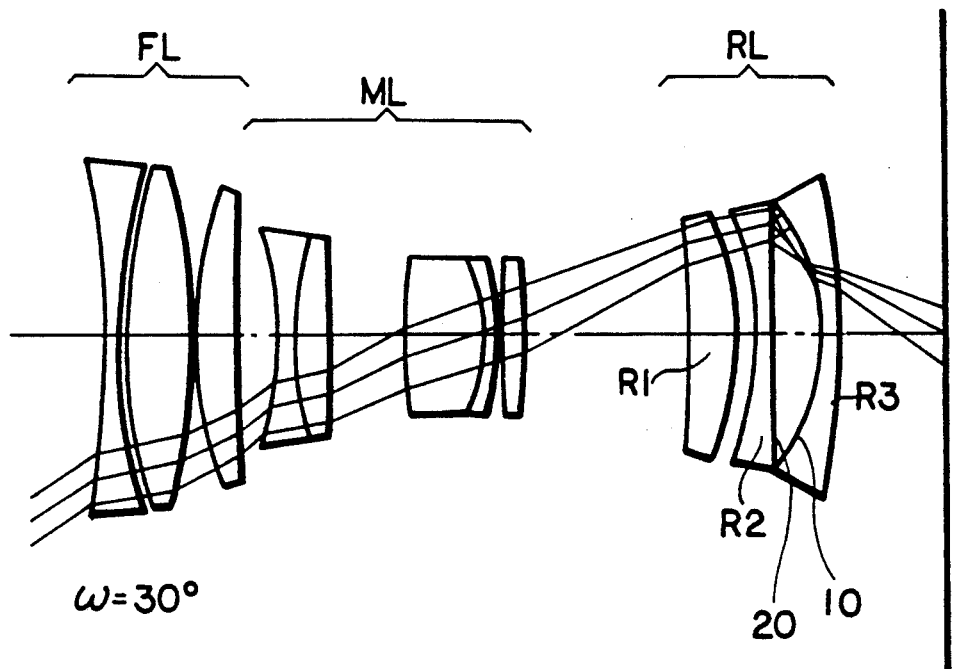
FIGS. 8a and 8b are schematic view of a lens arrangement to which a ghost prevention optical system according to still another aspect of the present invention is applied, at different focal lengths, respectively; and, FIGS. 9a, 9b and 9c are schematic view of a lens arrangement to which a ghost prevention optical system according to still another aspect of the present invention is applied, at different focal lengths, respectively.

FIG. 8a shows a zoom lens having three lens groups, i.e., first (front), second (intermediate) and third (rear) lens groups FL, ML, RL, to which the present invention is applied.

In the lens arrangements illustrated in FIGS. 6, 7 and 8a, the rear negative lens group RL is comprised of three lenses R1, R2 and R3. The ghost image occurs due to the reflection of light by a front surface 10 of the third lens R3 and a rear surface 20 of the second lens R2. Accordingly, the boundary reflection surfaces 10 and 20 are coated with anti-reflection coatings as mentioned above to prevent the ghost image.

Light which forms a ghost image is first reflected by the front surface 10 of the third lens R3 which has a large curvature (small incident angle of light) and is then reflected by the rear surface 20 of the second lens R2 which has a small curvature (large incident angle). In other words, when the two reflection surfaces of the rear lens group RL are located in such a manner so as to satisfy the relationship of curvature and order of reflection which causes the light beams to be reflected by the lens boundary surfaces, a ghost image tends to occur.

The same is true in all the arrangements illustrated in FIGS. 6, 7 and 8a. Accordingly, it is preferable to coat the front surface 10 of the third lens RL having a small incident angle (n · sin $\theta$) with the anti-reflection coating which has a small reflectance in the long wavelength band.

Figure 8B:
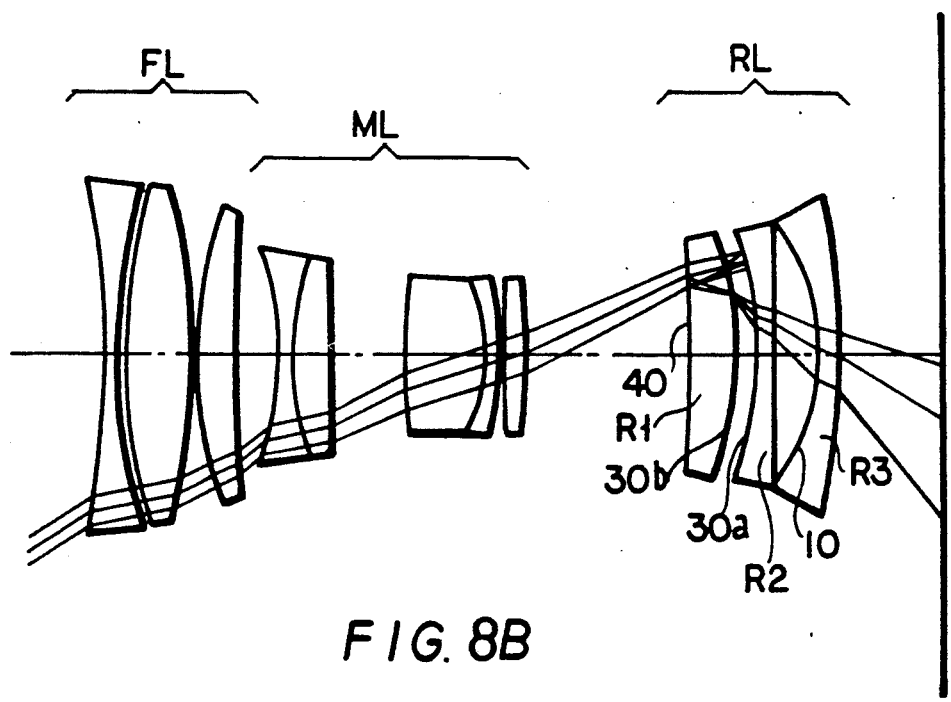

Alternatively, in some arrangements, it is preferable to coat the lens surface having a large incident angle with the anti-reflection coating which has a small reflectance in the long wavelength band, rather than the lens surface having a small incident angle, depending on the light beams and optical system. An example of this arrangement is shown in FIG. 8b. The structure of the lens system shown in FIG. 8b is identical to that of FIG. 8a. In the rear lens group RL, the incident angle n · sin $\theta$ is larger at the front surface 40 of the first lens R1 than at the front surface 30a of the second lens R2. However, the rear surface 30b of the first lens R1 or the front surface 10 of the third lens R3 could act as the first reflection surface before being reflected again by the facing boundary reflection surface 40 to thereby cause the ghost image. In such case, the boundary reflection surfaces 10, 30a and 30b are coated with a single layer of an inexpensive anti-reflection coating having a small reflectance in the short wavelength band, and the boundary reflection surface 40 having a large incident angle is coated with a multi-layer anti-reflection coating having a small reflectance in the long wavelength band so that an inexpensive composite coating can be realized.

Figure 9A:
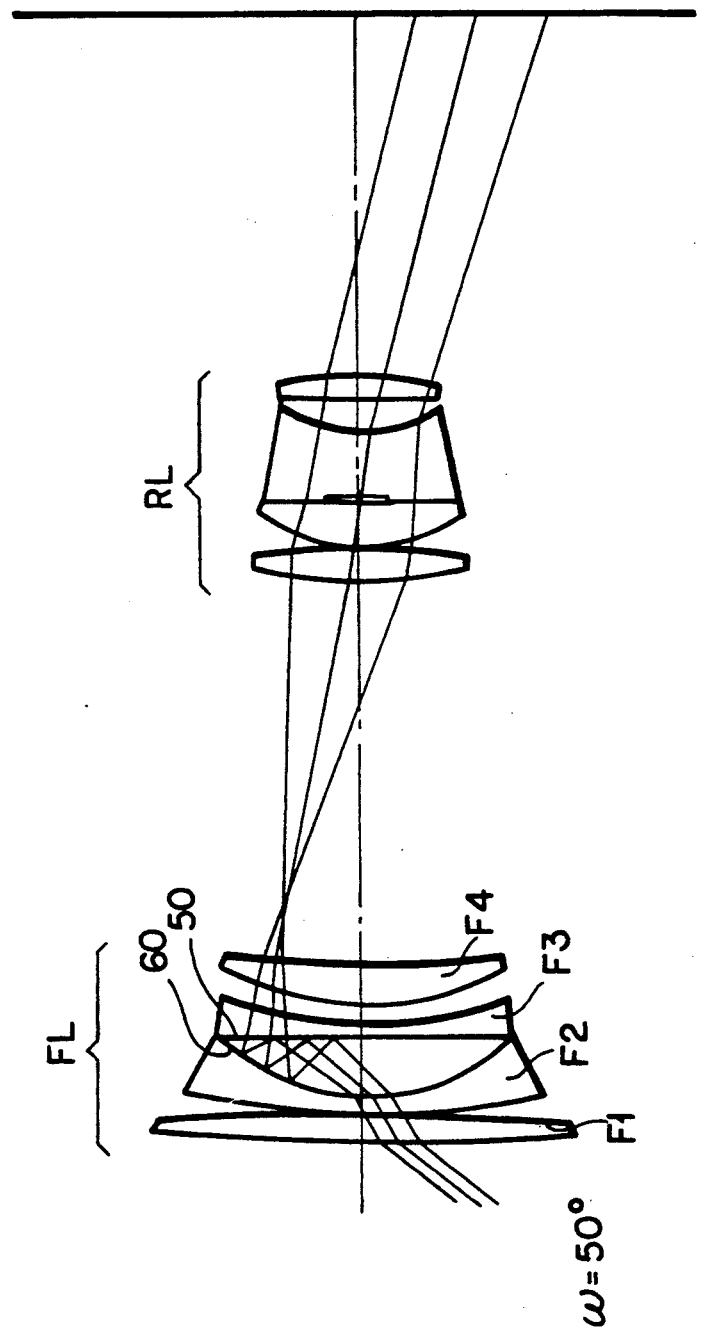
Figure 9B:
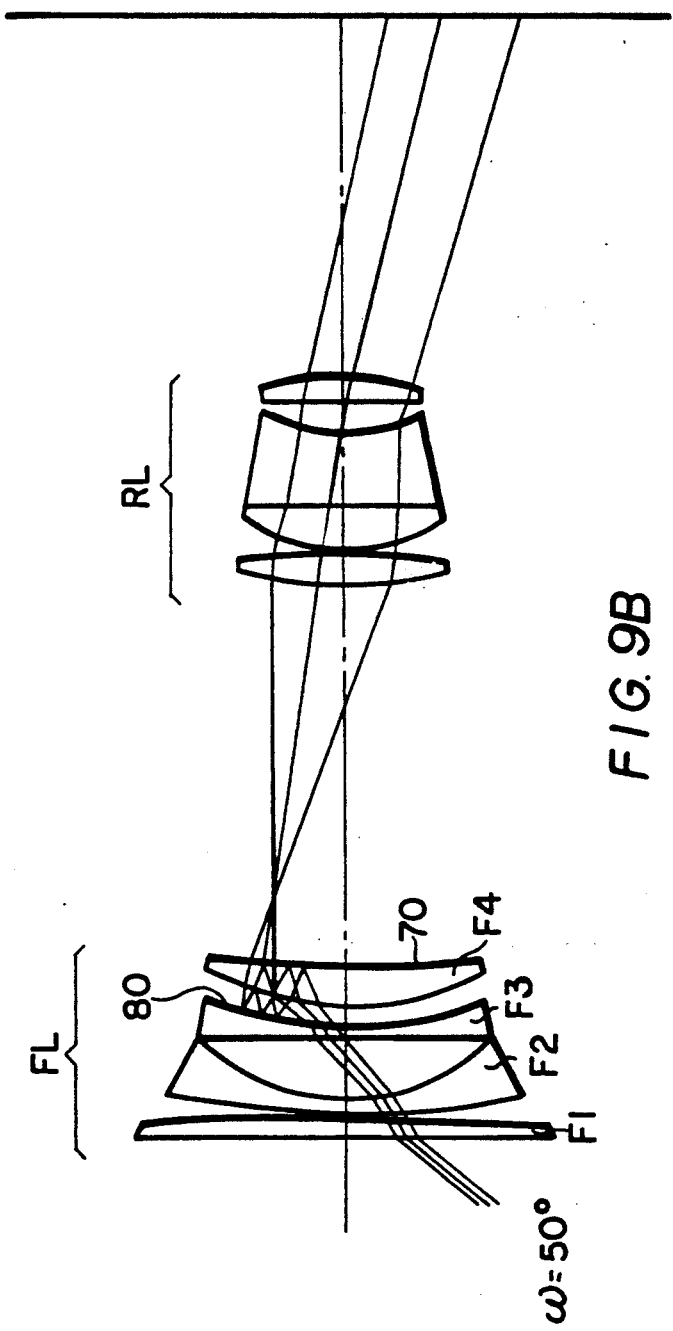
Figure 9C:
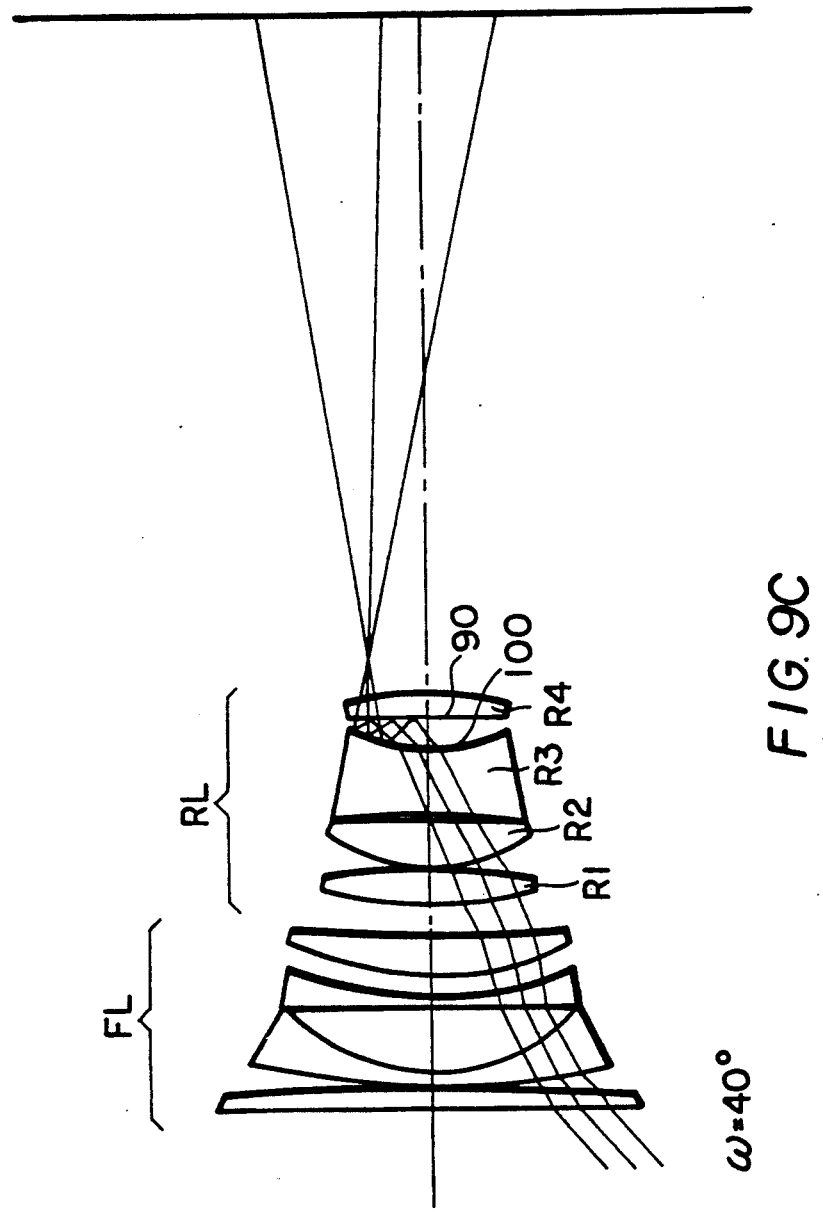

FIGS. 9a, 9b and 9c show a retrofocus type zoom lens having a front negative lens group FL and a rear positive lens group RL to which the present invention is applied.

The retrofocus lens essentially corresponds to a telephoto type lens system in which the objective side and the image side are inverted.

In the retrofocus type zoom lens shown in FIGS. 9a, 9b and 9c, the front negative lens group FL is comprised of first, second, third, and fourth lenses F1, F2, F3 and F4. At the telephoto extremity position shown in FIGS. 9a and 9b, ghost images result from the reflections by the front surface 50 of the third lens F3 and the rear surface 60 of the second lens F2, as shown in FIG. 9a, or reflections by the rear surface 70 of the fourth lens F4 and the rear surface 80 of the third lens F3, as shown in FIG. 9b, depending on the incident point and the incident angle.

Conversely, in the wide angle position shown in FIG. 9c, the second reflection surface which causes the ghost image exists in the rear positive group RL. In the illustrated embodiment, the rear positive lens group RL is comprised of first, second, third and fourth lenses R1, R2, R3 and R4. The ghost image is formed when light is reflected by the front surface 90 of the fourth lens R4 and the rear surface 100 of the third lens R3.

Therefore, in the arrangement illustrated in FIGS. 9a, 9b and 9c, the two boundary reflection surfaces 50 and 60, 70 and 80, and 90 and 100 are coated with the anti-reflection coatings as mentioned above to eliminate the ghost image throughout the whole wavelength band, respectively, according to the present invention.

In the retrofocus type lens, both the curvatures of the first reflection surfaces 50, 70 and 90 on which the first reflection of light takes place (large incident angle) and the curvatures of the second reflection surfaces 60, 80 and 100 on which the second reflection of light takes place (small incident angle) are large, contrary to the telephoto type lens mentioned above. Therefore, the second reflection surfaces 60, 80 and 100 are preferably coated with the anti-reflection coating which has a small reflectance in the long wavelength band.

Needless to say, the present invention is not limited to the illustrated embodiments. The basic concept of the present invention resides in the recognition of the reflection surfaces which cause the ghost image and the coating treatment of the reflection surfaces with an anti-reflection layer.

I claim:

1. In a transmission optical system of the type including a plurality of transmission optical elements having boundary reflection surfaces which form a ghost image when light is reflected by at least two specific boundary reflection surfaces, the improvement comprising a ghost eliminating optical system in which said specific boundary reflection surfaces are coated with at least two anti-reflection coatings having complementary reflection characteristics to eliminate said ghost image, said two anti-reflection coatings being such that the total anti-reflection curve characteristic of the two coatings, over a wide wavelength band, is flatter than the anti-reflection curve characteristic of either of the two anti-reflection coatings taken individually.

2. A ghost image eliminating optical system according to claim 1, wherein said at least two anti-reflection coatings have different reflectance characteristics, one of said at least two anti-reflection coatings having a small reflectance in a specific wavelength band and the other anti-reflection coating having a large reflectance in said specific wavelength band.

3. A ghost image eliminating optical system according to claim 2, wherein the refractive indexes of media defined by said at least two specific boundary reflection surfaces are n, the angle of light incident thereon is $\theta$, the specific boundary reflection surface has a small value of $n \cdot \sin \theta$ and is coated with an anti-reflection coating having a smaller long wavelength band reflectance than a short wavelength band reflectance.

4. A ghost eliminating optical system according to claim 2 wherein the refractive indexes of media defined by said at least two specific boundary reflection surfaces are n, the angle of light incident thereon is $\theta$, the specific boundary reflection surface has a high value of $n \cdot \sin \theta$ and is coated with an anti-reflection coating having a smaller short wavelength band reflectance than long wavelength band reflectance.

5. A ghost image eliminating optical system according to claim 1, wherein said transmission optical system is comprised of a telephoto type lens system including a front positive lens group and a rear negative lens group.

6. A ghost image eliminating optical system according to claim 5, wherein said rear negative lens group comprises two specific boundary reflection surfaces coated with anti-reflection coatings having said complementary reflection characteristics.

7. A ghost image eliminating optical system according to claim 6, wherein said two specific boundary reflection surfaces of the rear negative lens group are comprised of a first boundary reflection surface of large curvature on which a first reflection of light takes place and a second boundary reflection surface of small curvature on which a second reflection of light takes place.

8. A ghost image eliminating optical system according to claim 7, wherein said refractive indexes of media defined by said specific boundary reflection surfaces are n, the angles of light incident thereon are $\theta$, and the value of $n \cdot \sin \theta$ at said specific boundary reflection surface having a large curvature is smaller than that of said specific boundary reflection surface having a small curvature.

9. A ghost image eliminating optical system according to claim 8, wherein said specific boundary reflection surface having a small value of $n \cdot \sin \theta$ is coated with said anti-reflection coating having a smaller long wavelength band reflectance than short wavelength band reflectance.

10. A ghost image eliminating optical system according to claim 9, wherein the specific boundary reflection surface having a large value of $n \cdot \sin \theta$ is coated with said anti-reflection coating having a smaller short wavelength band than long wavelength band reflectance.

11. A ghost image eliminating optical system according to claim 1, wherein said transmission optical system comprises a zoom lens including three lens groups.

12. A ghost image eliminating optical system according to claim 11, wherein said anti-reflection coatings having complementary reflection characteristics are provided on two of said boundary reflection surfaces of a rear most lens group of the three lens groups of the zoom lens.

13. A ghost image eliminating optical system according to claim 12, wherein said two boundary reflection surfaces of said rear most lens group include a first boundary reflection surface of large curvature on which a first reflection of light, which forms the ghost image, takes place and a second boundary reflection surface of small curvature on which a second reflection of light takes place.

14. A ghost image eliminating optical system according to claim 13, wherein said refractive indexes of media defined by said specific boundary reflection surfaces are n, the angles of light incident thereon are $\theta$, the value of $n \cdot \sin \theta$ at said specific boundary reflection surface having a large curvature is smaller than that of the specific boundary reflection surface having a small curvature.

15. A ghost image eliminating optical system according to claim 14, wherein said specific boundary reflection surface having a small value of $n \cdot \sin \theta$ is coated with an anti-reflection coating having a smaller long wavelength band reflectance than short wavelength band reflectance.

16. A ghost eliminating optical system according to claim 14, wherein said specific boundary reflection surface having a large value of $n \cdot \sin \theta$ is coated with said anti-reflection coating having a smaller short wavelength band inflectance than long wavelength band reflectance.

17. A ghost image eliminating optical system according to claim 1, wherein said transmission optical system comprises a retrofocus type zoom lens including a front negative lens group and a rear positive lens group.

18. A ghost image eliminating optical system according to claim 17, wherein said anti-reflection coatings having said complementary reflection characteristics are provided on two boundary reflection surfaces of said front negative lens group.

19. A ghost image eliminating optical system according to claim 17, wherein said anti-reflection coatings having said complementary reflection characteristics are provided on two boundary reflection surfaces of the rear positive lens group.

20. A ghost image eliminating optical system according to claim 19, wherein said two boundary reflection surfaces of the rear positive lens group include a first boundary reflection surface of small curvature on which a first reflection of light, which forms the ghost image, occurs and a second boundary reflection surface of large curvature on which a second reflection of light takes place.

21. A ghost image eliminating optical system according to claim 20, wherein assuming said refractive indexes of media defined by said specific boundary reflection surfaces are n, the angles of light incident thereon are $\theta$, and the value of $n \cdot \sin \theta$ at said specific boundary reflection surface having a small curvature is larger than that of said specific boundary reflection surface having a large curvature.

22. A ghost image eliminating optical system according to claim 21, wherein said specific boundary reflection surface having a small value of $n \cdot \sin \theta$ is coated with an anti-reflection coating which has a smaller long wavelength band reflectance than short wavelength band reflectance.

23. A ghost image eliminating optical system according to claim 21, wherein said specific boundary reflection surface having a large value of n . sin $\theta$ is coated with an anti-reflection coating having a smaller short wavelength band reflectance than long wavelength band reflectance.

24. A ghost image eliminating optical system according to claim 1, wherein said reflective indexes of media defined by said specific boundary reflection surfaces are n, angles of light incident thereon are $\theta$, and the specific boundary reflection surface having a larger value of n . sin $\theta$ is coated with an anti-reflection coating having a smaller long wavelength band reflectance than short wavelength band reflectance.

25. A ghost image eliminating optical system according to claim 24, including a plurality of other specific boundary reflection surfaces having a smaller value of n . sin $\theta$ and said specific boundary reflection surface having a larger value of n . sin $\theta$ define surfaces which would otherwise cause a ghost image, each of said plurality of other specific boundary reflection surfaces having a smaller value of n . sin $\theta$ being coated with anti-reflection coatings having a smaller short wavelength band reflectance than long wavelength band reflectance.

26. A ghost image eliminating optical system according to claim 25, wherein a first reflection of light, which forms said ghost image, is effected by said boundary reflection surface of a smaller value of n . sin $\theta$ and a second reflection of light is effected by said boundary reflection surface of a larger value of n . sin $\theta$.

* * * * *

UNITED STATES PATENT AND TRADEMARK OFFICE
CERTIFICATE OF CORRECTION

PATENT NO. : 5,193,028
DATED : March 9, 1993
INVENTOR(S) : Masato Noguchi

It is certified that error appears in the above-indentified patent and that said Letters Patent is hereby corrected as shown below:

Title page, item [30], Foreign Application Priority Data, the date of "September 11, 1990" should read-- November 9, 1990--.

Signed and Sealed this

Twenty-sixth Day of April, 1994

Attest:

BRUCE LEHMAN

*Attesting Officer*          Commissioner of Patents and Trademarks